(12) United States Patent
Horton

(10) Patent No.: US 7,762,215 B2
(45) Date of Patent: Jul. 27, 2010

(54) UNIVERSAL RETRACTABLE ZIP CLIP

(76) Inventor: Michael Horton, P.O. Box 16306, Seattle, WA (US) 98116

( * ) Notice: Subject to any disclaimer, the term of this patent is extended or adjusted under 35 U.S.C. 154(b) by 155 days.

(21) Appl. No.: 11/596,527

(22) PCT Filed: May 3, 2005

(86) PCT No.: PCT/US2005/015166

§ 371 (c)(1),
(2), (4) Date: Nov. 14, 2006

(87) PCT Pub. No.: WO2005/115101

PCT Pub. Date: Dec. 8, 2005

(65) Prior Publication Data

US 2008/0042000 A1 Feb. 21, 2008

(51) Int. Cl.
*B65H 75/34* (2006.01)
(52) U.S. Cl. .............. 119/796; 242/379; 242/379.2
(58) Field of Classification Search .............. 242/371, 242/379, 379.2; 119/796
See application file for complete search history.

(56) References Cited

U.S. PATENT DOCUMENTS

| 5,732,662 | A | * | 3/1998 | Jacobsen | 119/798 |
| 5,740,764 | A | * | 4/1998 | Jacobsen | 119/798 |
| 5,938,137 | A | * | 8/1999 | Poulson | 242/379.2 |
| 5,954,288 | A | | 9/1999 | Shih | |
| 6,364,237 | B1 | | 4/2002 | Kagel | |
| D482,521 | S | | 11/2003 | Taylor | |
| 6,935,277 | B2 | * | 8/2005 | Vaccari | 119/796 |
| 7,040,257 | B2 | * | 5/2006 | Waxman et al. | 119/796 |
| 2003/0145804 | A1 | * | 8/2003 | Vaccari | 119/796 |
| 2004/0237906 | A1 | * | 12/2004 | Waxman et al. | 119/796 |

* cited by examiner

*Primary Examiner*—Sang Kim
(74) *Attorney, Agent, or Firm*—Harpman & Harpman

(57) ABSTRACT

A clip configuration including a contoured case forming a support opening for a movable clasp element defining a universal clip. A winding mechanism within the casing includes a spring urged spool having a retractable cord which extends with an attachment ring positioned on its free end.

5 Claims, 4 Drawing Sheets

UNIVERSAL RETRACTABLE ZIP CLIP

BACKGROUND OF THE INVENTION

This device relates to extensible retractable hanging devices that are used to attach to a variety of small items to avoid their being lost or misplaced. Such devices have an extending clip configuration for attachment purposes. Prior art devices may be seen in U.S. Pat. Nos. 5,954,288, 5,938,137, 6,364,237 and D482,521.

SUMMARY OF THE INVENTION

The present invention is directed to an improvement in a retractable tether clip combination in which the improvement is directed to the utilization of a resilient clip configuration having an integral retractable tether within. The body of the resilient clip is of a carabiner type which is in vertical spaced relation to an integrally enclosed retractable tether deployable therefrom.

DESCRIPTION OF THE PREFERRED EMBODIMENT

Figure 1:
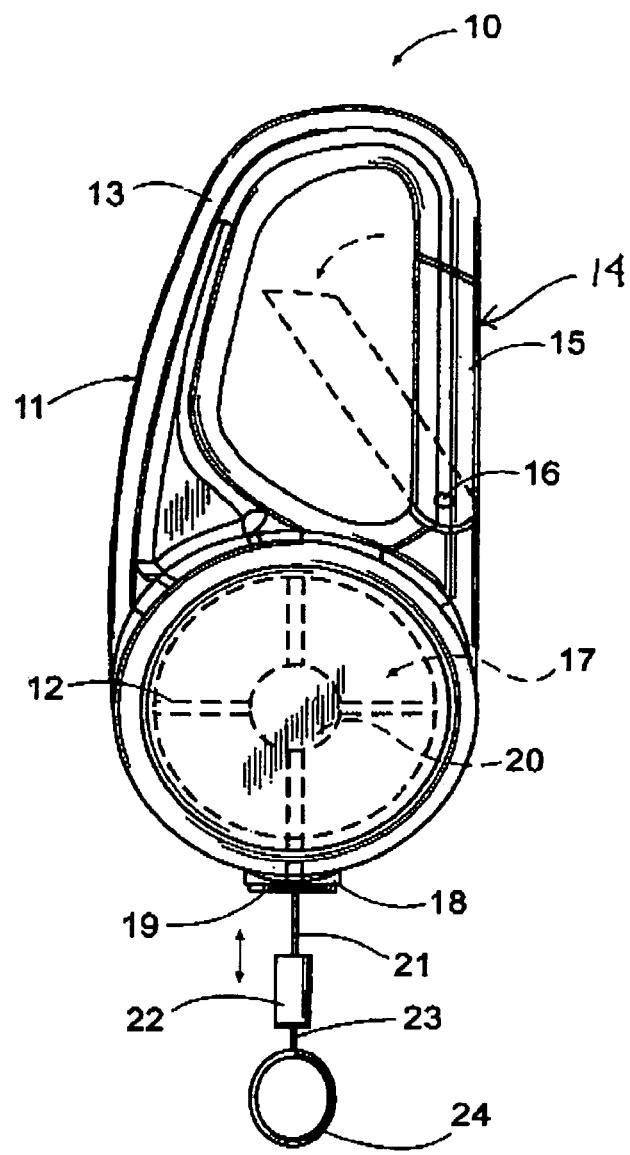
FIG. 1 is a side elevational view of the of the invention with portions shown in broken lines within.
Figure 2:
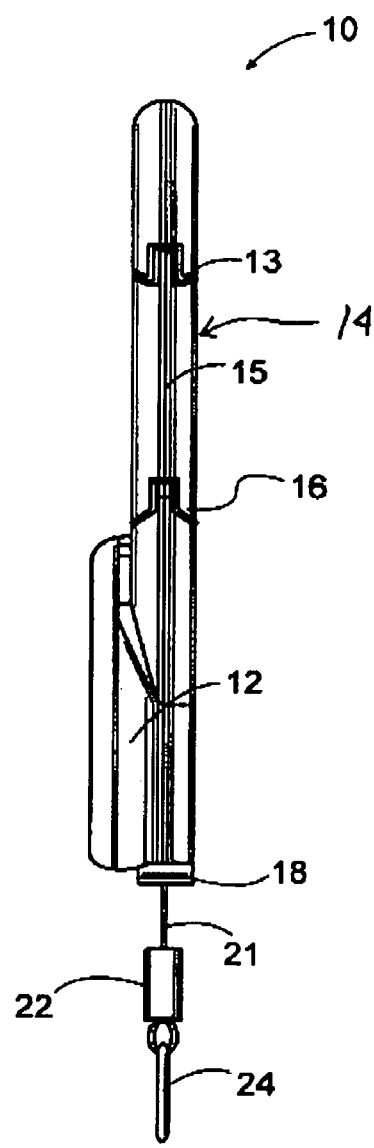
FIG. 2 is an end elevational view thereof.
Figure 3:
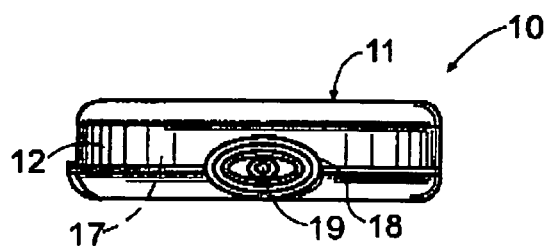
FIG. 3 is a bottom plan view thereof.

Referring to FIGS. 1, 2 and 3 of the drawings, a tether clip 10 of the invention can be seen having a contoured main body member 11 defining a retraction case 12. An upstanding curved arm portion 13 forms a movable clip 14 having a spring urged retainment bar element 15 pivoted at 16 through the main body member 11 for engagement therewith as will be well known and understood by those skilled in the art.

A retractable tether assembly 17, shown in dotted lines, is mounted within the retainment case 12 which has a depending portion 18 forming a deployment portal at 19 therein. The retractable tether assembly 17 has a central spring winding fitting 20 around which is coiled a deployable tether line 21. A line stop 22 is secured adjacent the free end of the line 21 and attachment loop 23 extending therefrom. Typically, an access engagement ring 24 is fitting through the loop 23 providing a universal attachment means thereto.

It will be evident from the above description that the tether clip 10 of the invention can be selectively positioned to a variety of attachment points such as clothing, backpacks, via its clip 14 by pivotal placement of the retainment bar portion 15 as illustrated in broken lines in FIG. 1 of the drawings.

The retractable tether line 21 can be correspondingly secured to items by the engagement ring 24 that one wishes to maintain in close proximity to the clip attachment point such as a cell phone, key chain, flashlight, etc., (not shown). The retractable tether line assembly 17 will allow for deployment of the tether line 21 therefrom to a selective distance and then be retracted, as required.

Figure 4:
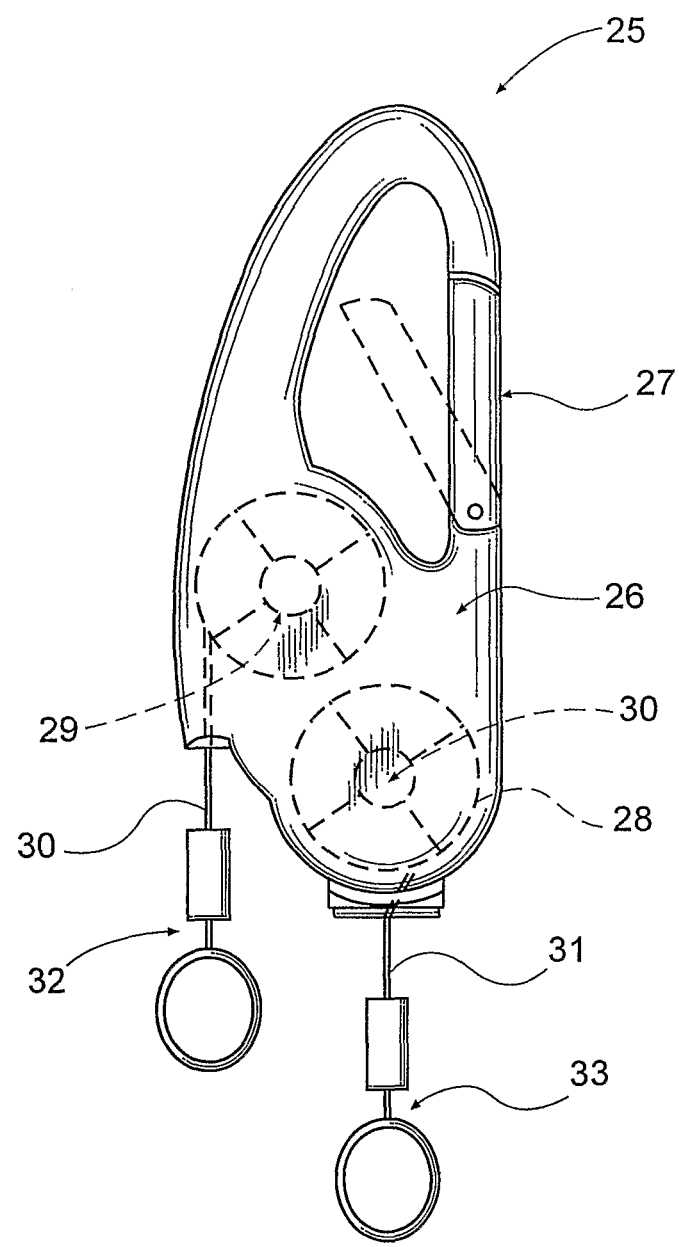
FIG. 4 is a side elevational view of an alternate dual clip configuration having a pair of retractable tether deployed therefrom.
Figure 5:
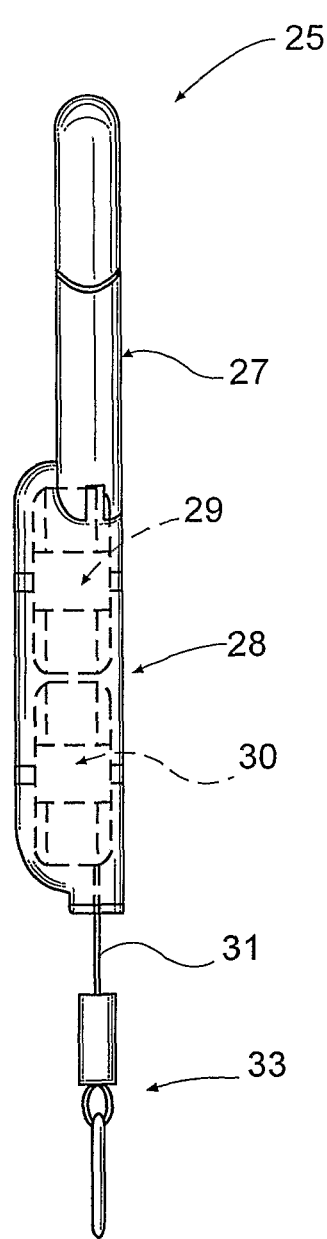
FIG. 5 is an end elevational view thereof.

Referring now to FIGS. 4 and 5 of the drawings, an alternate form of the invention can be seen as a dual tether zip clip 25 having a body member 26 with a movable clip 27 extending therefrom. The main body member 26 defining a contoured retraction case 27 with corresponding spring winding assemblies 28 and 29 there within each having a coiled deployable respective tether lines 30 and 31 extending therefrom. Associated line stops and engagement ring fittings 32 and 33 provide for attachment points as previously described in the primary form of the invention.

Figure 6:
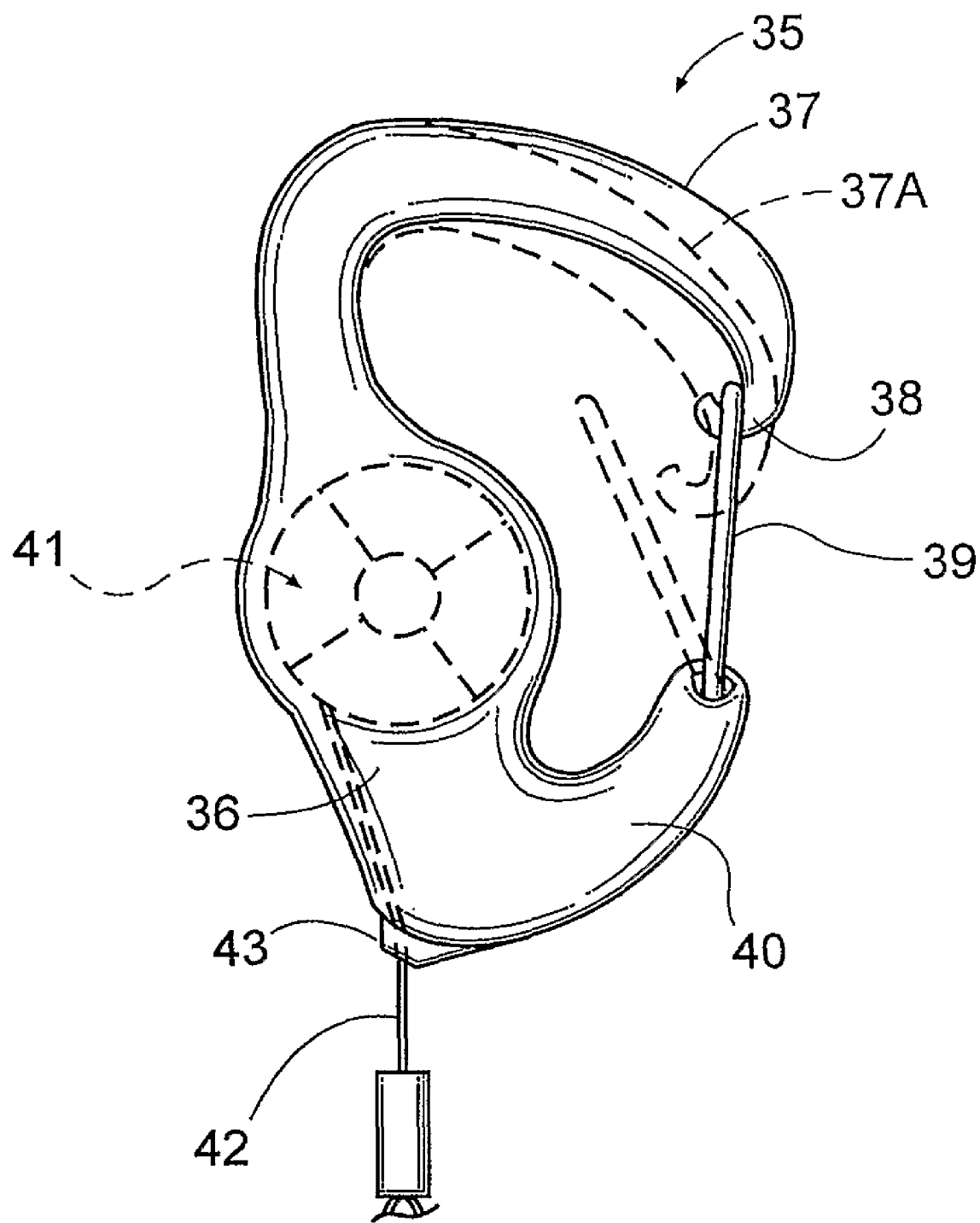
FIG. 6 is a side elevational view of a second alternate form of the clip configuration of the invention having a manual urged engageable hook clip and a retractable tether line extending therefrom.

A manual tether clip configuration 35 is illustrated in FIG. 6 of the drawings in which a contoured clip case 36 has a flexible arm portion 37 with a hook end portion 38 thereon. A linkage element 39 pivotally extends from a second arm portion 40 for aligned registration with the hook 38 upon manual deflection of the arm portion 37, seen in broken lines at 37A allowing for engagement or disengagement of the linkage element 39 therefrom as is well known and understood by those skilled in the art.

A single retractable tether line assembly 41 is positioned within the contoured clip case 36 with a single tether line 42 deployable therefrom through a line portal 43.

It will be evident from the above description that an additional retractable tether line assembly can be positioned within the contoured clip case 36 by making a modification thereto as was the case as set forth in the dual tether clip 25 and associated contoured case 26 as hereinbefore described.

Figure 7:
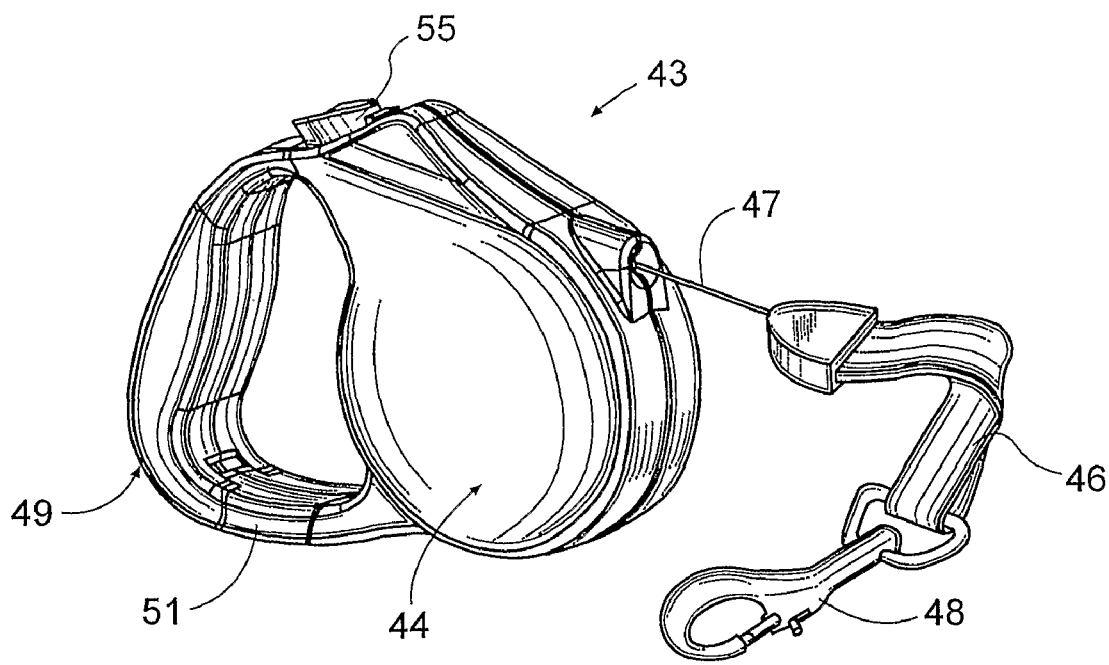
FIG. 7 is a perspective view of a third alternate form of the invention having an elongated handle clip portion with a retractable lead extending therefrom.
Figure 8:
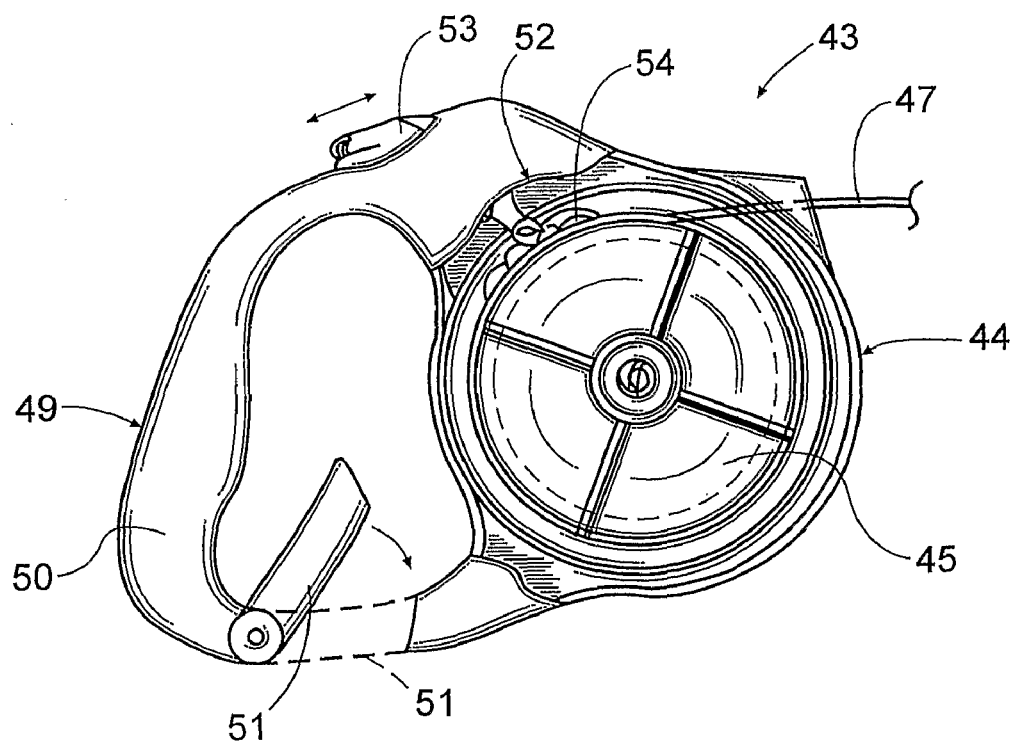
FIG. 8 is a front elevational view thereof with portions broken away.

Referring now to FIGS. 7 and 8 of the drawings, a third alternate form of the invention can be seen wherein a retractable dog lead clip 43 is illustrated having a main body member 44 with a spring operable retractable tether lead assembly 45 rotatably positioned within. A secondary leash lead 46 is secured to the end of the tether line 47 of the retractable tether lead assembly 45 with a collar clip 48 secured thereto. The main body member 44 has a handle portion 49 defining a contoured arm 50 from which is pivotally secured a spring urged handle bar element 51 to complete the handle configuration. It will be evident that this so configured handle portion 49 will act as a temporary attachment point for the dog lead clip 43 with the same functionality parameters as the hereinbefore described tether clip 10 and alternate tether clips 25 and 35 as hereinbefore described.

The retractable tether lead assembly 45 is selectively controlled by a lead line lock assembly 52 having an operable engagement, disengagement button 53 and interconnected lead line break engagement surface elements 54 which will control the deployment of the tether lead line 47 which is spring urged to retract as is well known within the art.

It will thus be seen that a new and novel zip clip configuration has been illustrated and described and it will be apparent to those skilled in the art that various changes and modifications may be made thereto without departing from the spirit of the invention.

Therefore I claim:

1. A retractable tether line clip combination for selectively securing personal items to a user's person comprises, a contoured hollow body housing having an integral arm dip portion, a spring urged rigid retainment bar pivotally secured to said housing in end to end longitudinal interlocking alignment with said arm clip portion, the rigid retainment bar is of an overall equal cross-sectional dimension as that of said aligned arm clip portion, a spring winding fitting within said housing, a spool in communication with said spring winding fitting, a retractable tether line extending about said spool and extending from said housing in centered trans-axial alignment from said spool, a line stop on said tether line inwardly of its free end thereof.

2. The retractable tether line clip combination set forth in claim 1 wherein said spring urged rigid retainment bar is movable from a first longitudinally aligned engaged position with said arm clip portion to a second non-engaged non-aligned position thereto and said rigid retainment bar is of an equal diameter to that of said engageable arm clip portion.

3. The retractable tether line clip combination set forth in claim 1 wherein said line stop on said tether line inwardly of its free end thereof restricting full retraction of said tether line into said hollow body housing.

4. The retractable tether line clip combination set forth in claim 1 wherein said tether line has an access engagement ring attached to its free end for receiving ancillary personal items thereto.

5. The retractable tether line clip combination set forth in claim 1 wherein a second spring winding fitting and spool is positioned within said housing, a secondary tether line extending about and secured to said spool, said secondary spool and spring winding is in co-planar relationship to said first spring winding and spool in spaced relation to one another.

* * * * *